United States Patent [19]

Ishizeki

[11] Patent Number: 4,884,056
[45] Date of Patent: Nov. 28, 1989

[54] SYSTEM FOR DISPLAYING TROUBLE IN AN ELECTRONIC CONTROL SYSTEM OF A MOTOR VEHICLE

[75] Inventor: Seiichi Ishizeki, Ashikaga, Japan
[73] Assignee: Fuji Jukogyo Kabushiki Kaisha, Tokyo, Japan
[21] Appl. No.: 232,796
[22] Filed: Aug. 16, 1988

[30] Foreign Application Priority Data

Sep. 7, 1987 [JP] Japan ................... 62-223550

[51] Int. Cl.$^4$ .............................................. B60Q 1/00
[52] U.S. Cl. ......................................... 340/453; 303/92
[58] Field of Search ................... 340/52 B, 52 C, 505, 340/512, 454, 453, 452; 303/92

[56] References Cited

U.S. PATENT DOCUMENTS

| | | | |
|---|---|---|---|
| 3,947,811 | 3/1976 | Hodgson | 340/505 |
| 4,082,370 | 4/1978 | Leiber et al. | 340/52 B |
| 4,192,180 | 3/1980 | Gerstenmeier et al. | 303/92 |
| 4,700,304 | 10/1987 | Byme et al. | 303/92 |

FOREIGN PATENT DOCUMENTS 59-110933 6/1984 Japan .

*Primary Examiner*—Joseph A. Orsino
*Assistant Examiner*—Hollis T. Chen
*Attorney, Agent, or Firm*—Martin A. Farber

[57] ABSTRACT

A system for displaying trouble in an electronic control system such as an anti-skid brake system of a motor vehicle. The system has a detector for detecting failure in a wheel speed sensor, and a warning lamp for displaying a detected failure. When a failure in the sensor is displayed on the lamp, an inspector depresses a brake pedal of the vehicle in accordance with a predetermined pattern to intermittently turn on a brake pedal switch to produce a failure signal representing the nature of the detected failure. In response to the failure signal, the warning lamp intermittently lights up in accordance with a predetermined pattern representing the nature of the failure.

4 Claims, 6 Drawing Sheets

SYSTEM FOR DISPLAYING TROUBLE IN AN ELECTRONIC CONTROL SYSTEM OF A MOTOR VEHICLE

BACKGROUND OF THE INVENTION

The present invention relates to a system for displaying trouble in an electronic control system of a motor vehicle.

Japanese Patent Application Laid-Open 59-110933 discloses an indicating system for trouble in an electronic control system mounted on a motor vehicle for a suspension having an adjustable oil damper for damping road shock. The system has a select switch for automatically adjusting the damping power of the oil damper so as to adjust the level of the vehicle depending on conditions of the road. When the select switch is turned on, a selecting light is turned on to emit light for displaying a selected level. In the system, the selecting light is employed as a light for displaying an abnormality of a control mechanism of the vehicle. When the abnormality is detected, the selecting light is intermittently emitted to indicate the abnormality. when the light is continuously emitted, it indicates the select level.

Accordingly, in the system, since an independent light for indicating the abnormality is omitted, the structure is simplified. However, the nature of the abnormality, for example the location where the abnormality occurs, cannot be indicated.

SUMMARY OF THE INVENTION

The object of the present invention is to provide a system for displaying trouble in an electronic control system which may inform the nature of the trouble with a single lamp.

According to the present invention, there is provided a system for displaying trouble in an electronic control system of a motor vehicle having detecting means for detecting failure in the electronic control system, and a warning lamp for displaying a detected failure.

The system comprises means for detecting the nature of a failure in the electronic control system, comparing means for comparing the pattern of a pulse signal generated by operating a brake pedal switch in the vehicle with a predetermined stored pattern and for producing a failure signal representing the nature of the detected failure, and display means responsive to the failure signal for intermittently lighting the warning lamp in accordance with a predetermined pattern representing the nature of the failure.

In an aspect of the invention, the electronic control system is an anti-skid brake system.

The other objects and features of this invention will become understood from the following description with reference to the accompanying drawings.

DETAILED DESCRIPTION OF THE PREFERRED EMBODIMENT

Figure 1:
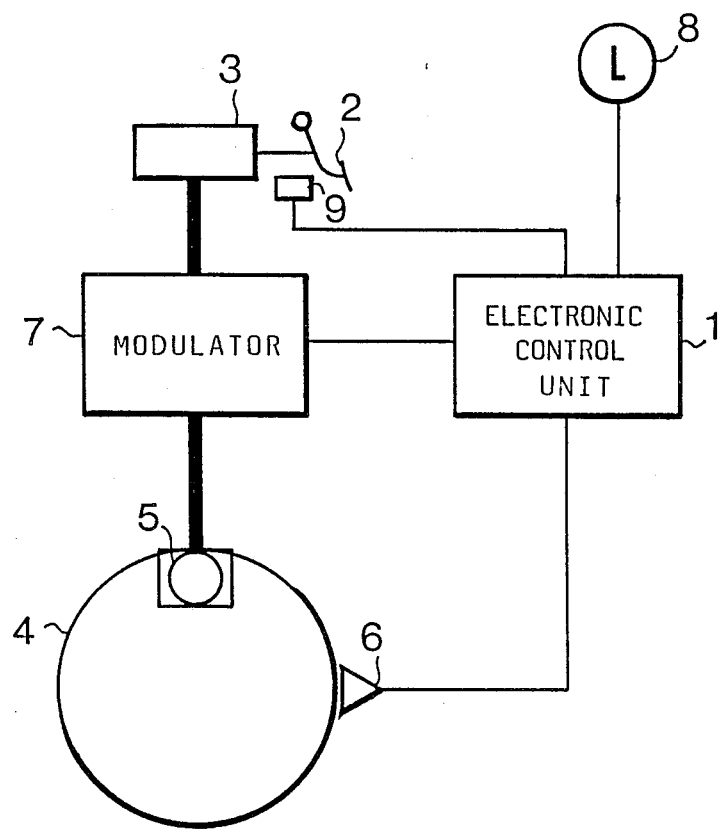
FIG. 1 is a schematic diagram showing a brake system for a motor vehicle to which the present invention is applied.

Referring to FIG. 1 showing a brake system for front and rear wheels having an anti-skid brake system as an electronic brake control system, a brake pedal 2 is connected to a master cylinder 3 for producing fluid pressure in accordance with the depression of the brake pedal 2. The master cylinder 3 is communicated with a modulator 7 of the anti-skid brake system. The modulator 7 is communicated with a brake device 5 of a wheel 4 (only one of a plurality of the wheels being shown). A wheel speed sensor 6 is provided adjacent the wheel 4 and produces a wheel speed signal which is applied to an electronic control unit 1 of the anti-skid brake system. An output signal of the control unit 1 is applied to the modulator 7. The modulator 7 has various valves such as a decay solenoid valve for reducing the pressure, and a hold solenoid valve for increasing and holding the pressure, so as to control the brake fluid pressure when the anti-skid brake system is in operation. The system further has a brake pedal switch 9 which is closed by depressing the brake pedal 2 and which is connected to the control unit 1, and a warning lamp 8 connected to the unit 1.

Figure 3:
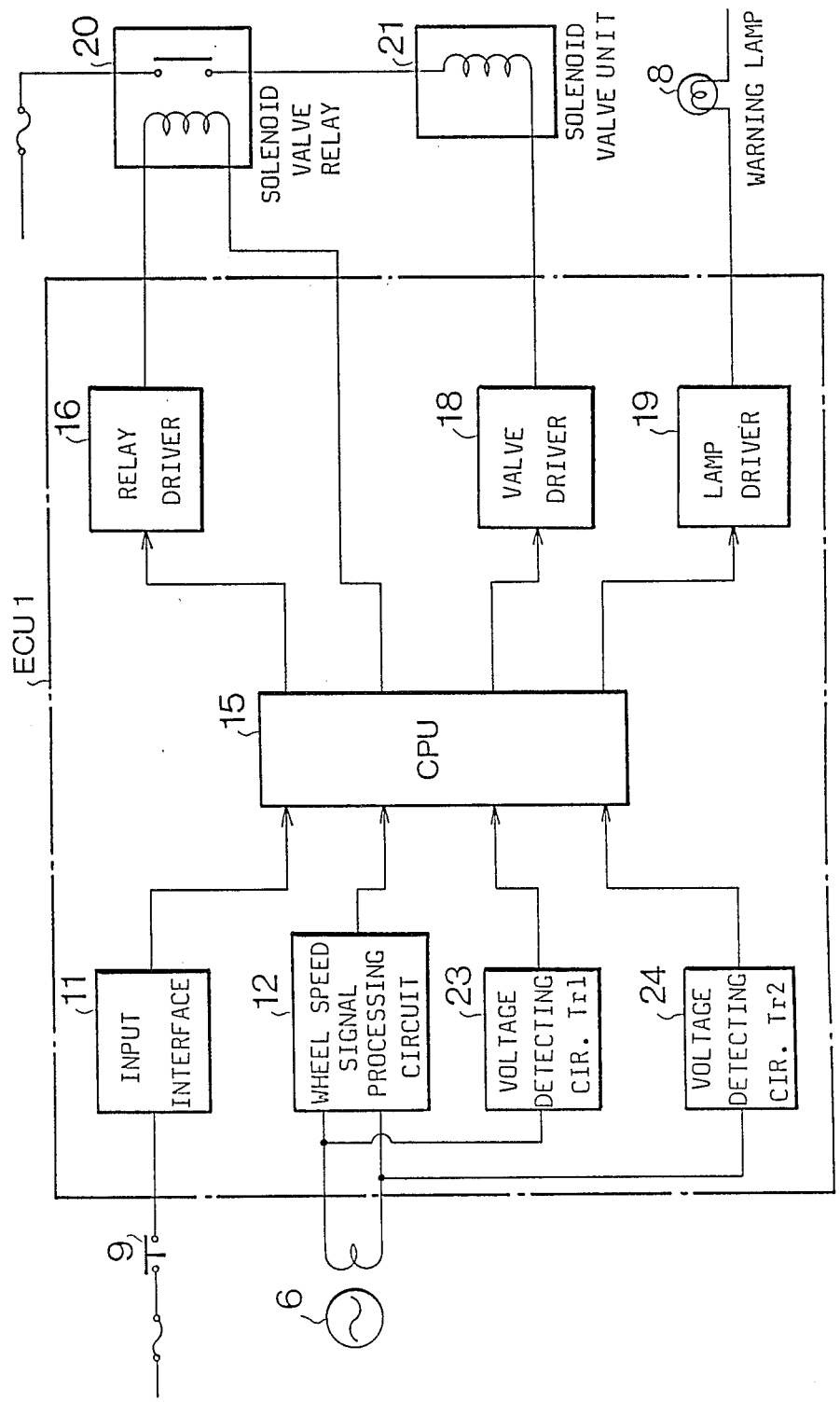
FIG. 3 is a block diagram showing an electronic control unit of the present invention.

Referring to FIG. 3, the electronic control unit (ECU) 1 comprises a CPU (central processing unit) 15. An input interface 11 is applied with the signal from the brake pedal switch 9. A wheel speed signal processing circuit 12 is applied with alternating voltage from the wheel speed sensor 6 representing the wheel speed. The alternating voltage is further applied to voltage detecting circuits 23 and 24. Both circuits have respectively transistors Tr1 and Tr2 which are connected in series in the CPU 15. Outputs of these circuits are applied to the CPU 15, which calculates speed changing rate from the input voltage. The control unit produces a relay signal in accordance with the speed changing rate.

The relay signal is applied to a relay driver 16 for controlling a solenoid valve relay 20 in the modulator 7. A valve driver 18 is provided for actuating a solenoid valve unit 21 including the decay solenoid valve and the hold solenoid valve. A lamp driver 19 is provided for emitting light from the warning lamp 8 in accordance with a warning signal from the CPU 5.

When the brake pedal 2 is depressed, the master cylinder 3 produces the brake fluid pressure which is supplied to the brake device 5 to brake the wheel 4. When the reduction rate of the wheel speed by the braking exceeds a predetermined value, the control unit 1 produces a hold signal. The hold signal is applied to the hold solenoid valve in the modulator 7 to maintain the fluid pressure in the brake device 5. Nevertheless, when the wheel speed is further reduced, the decay solenoid valve in the modulator 7 is actuated to reduce the pressure. Accordingly, the wheel speed reduction rate decreases. When the wheel speed reduction rate reaches a predetermined small value, the decay solenoid valve is turned off to maintain the pressure. Thereafter, when the wheel speed approaches the vehicle speed, the hold solenoid valve is actuated to increase the pressure to brake the wheels. By repeating the operation, locking of the wheels can be prevented.

The control unit 1 has functions of diagnosis and fail safe for failure of the system. If trouble such as disconnection of equipment or a short-circuit of a circuit in the anti-skid brake system occurs, the diagnosis system in the control unit 1 diagnoses the nature of the trouble.

The control unit 1 operates to stop supplying the current to the modulator 7, and turn on the warning lamp 8 for indicating the abnormality.

In the present invention, the warning lamp 8 is adapted to indicate the nature of the failure besides the abnormality indication. For example, if a failure in the wheel speed sensor 6 is detected, the lamp 8 indicates the position of the failing sensor in response to a command signal, as described hereinafter in detail.

Figure 2:
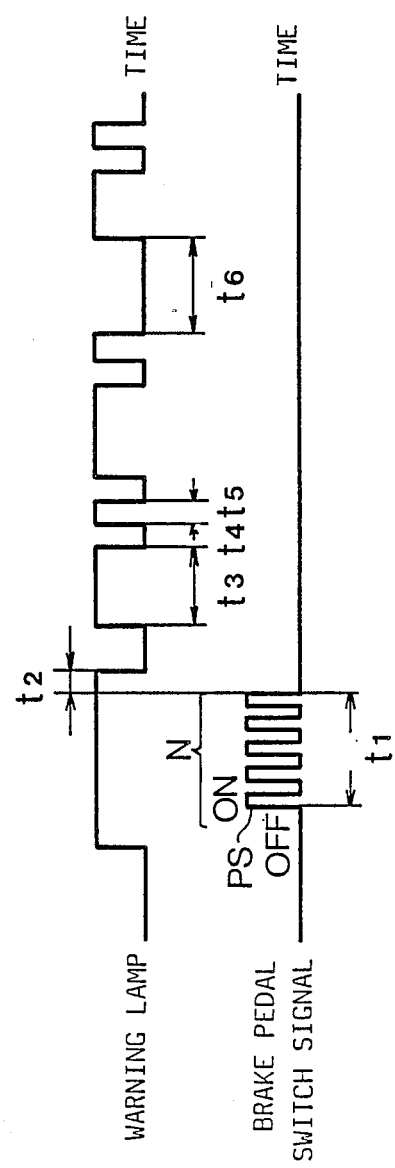
FIG. 2 shows waveforms showing a relationship between lighting of a warning lamp and a signal of a brake pedal switch signal as a display command signal.

The command signal is generated by operating a command signal switch by an inspector in an auto shop. An existing switch is used for the command signal switch. In the system, the brake pedal switch 9 is used. As shown in FIG. 2, when the warning lamp 8 is lighted, the brake pedal 2 is depressed in accordance with a predetermined pattern. For example, the brake pedal switch 9 is turned on predetermined times N (5 times) for a predetermined time t1 (5 sec.), to produce a pulse signal PS. The pulse signal PS is applied to the control unit. In the control unit 1, the pulse signal PS is compared with a signal pattern which is previously stored in the unit 1. When the pattern of the pulse signal PS coincides with the stored signal pattern, the control unit produces a failure nature signal for operating the lamp 8 in accordance with a coded light emitting pattern as shown in FIG. 2.

As one example, a coded light emitting pattern consists of a long emitting period t3 and a short emitting period t5, and a rest time t4 between periods t3 and t5, and these periods are arranged in a pattern. A waiting time t2 before starting the emitting operation is a predetermined time between zero and a few seconds. The rest time t4 may be the same length as the short emitting period t5. In order to avoid a mistake by an inspector, an interval t6 (3 sec., for example) is provided before the next cycle of the emitting operation.

Operations for the diagnosis will be described with reference to flow charts of FIGS. 4 to 6.

Figure 4:
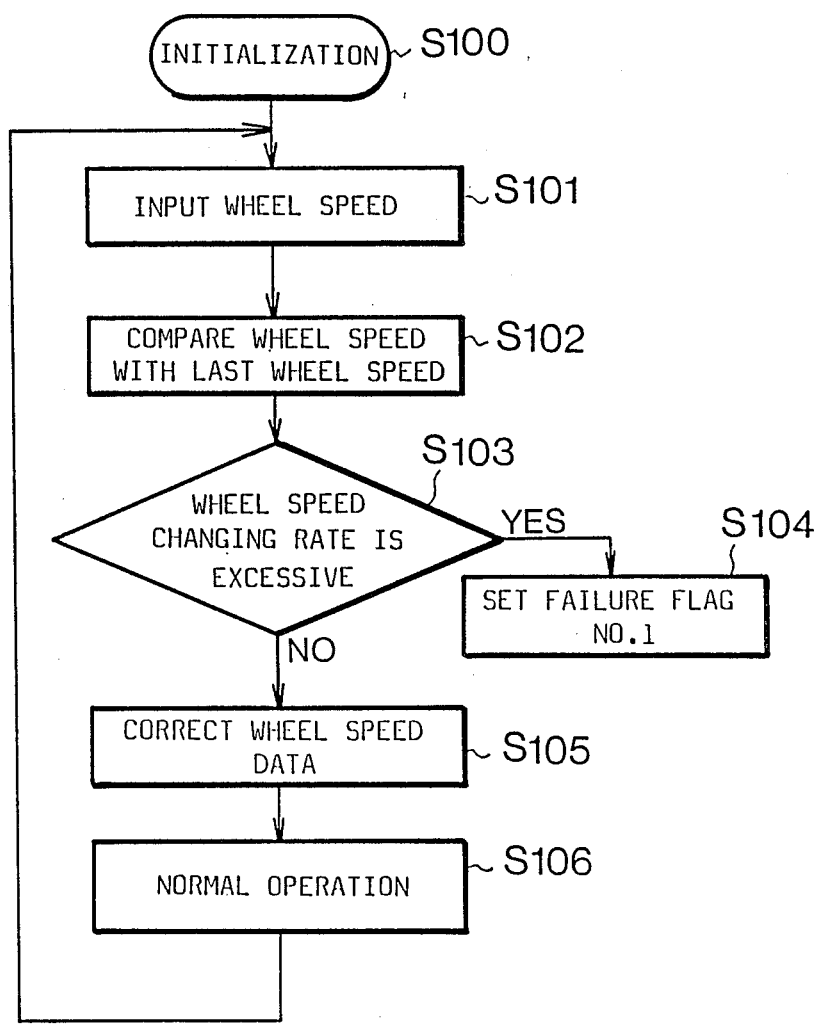
FIGS. 4 to 6 are flow charts showing operations of the system.

Referring to FIG. 4 showing an operation for detecting a failure of the wheel speed sensor 6 in a case of a soft check. When the power is applied to the CPU 15, the initialization is performed at a step S100. At first, the wheel speed signal is inputted at a step S101. Then at a step S102, the signal is compared with the last wheel speed signal detect at the last program. At a step S103, it is determined whether a wheel speed changing rate exceeds a predetermined value or not. If the excess of the changing rate is determined, a wheel speed sensor failure flag No.1 is set at a step S104. If not, the speed data is corrected at a step S105, and a normal operation is performed at a step S106.

Figure 5:
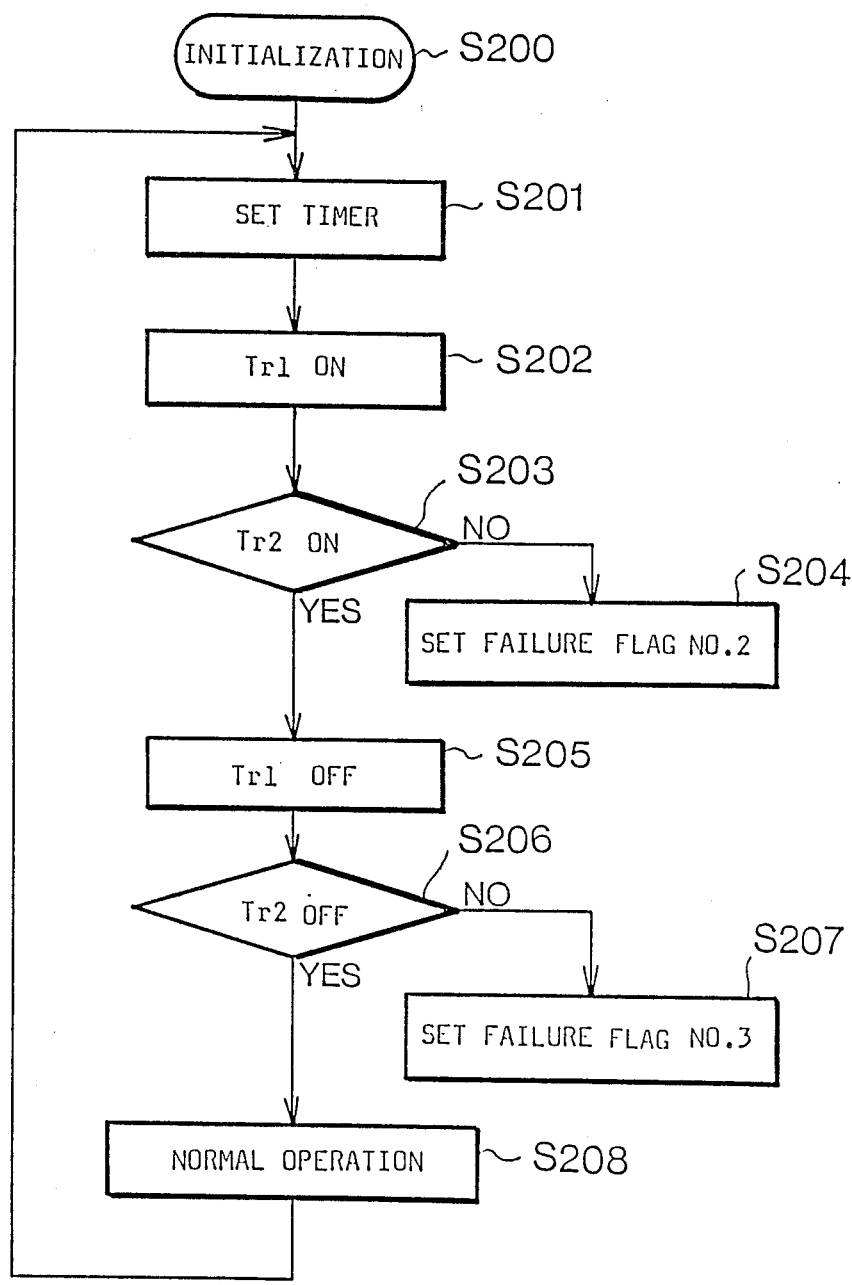

Referring to FIG. 5 showing an operation for detecting a failure of the wheel speed sensor in a case of a hard check. After the initialization at a step S200, a timer is set at a step S201, and transistor Tr1 is turned on at a step S202. Then, it is determined whether a voltage is applied to the transistor Tr2 to turn it on at a step S203. If there is no trouble in the speed sensor 6 and the circuit thereof, the transistor Tr2 is supplied with a voltage. Accordingly, if no voltage is applied to the transistor Tr2, a wheel speed sensor failure flag No.2 is set at a step S204. If the voltage is applied to the transistor Tr2, then, the transistor Tr1 is turned off at a step S205, so that the voltage is not applied to the transistor Tr1. Then it is determined whether the transistor Tr2 is also turned off or not at a step S206. If the transistor Tr2 is not turned off, a wheel speed sensor failure flag No.3 is set at a step S207. If the transistor Tr2 is turned off, the normal operation is performed at a step S208.

Figure 6:
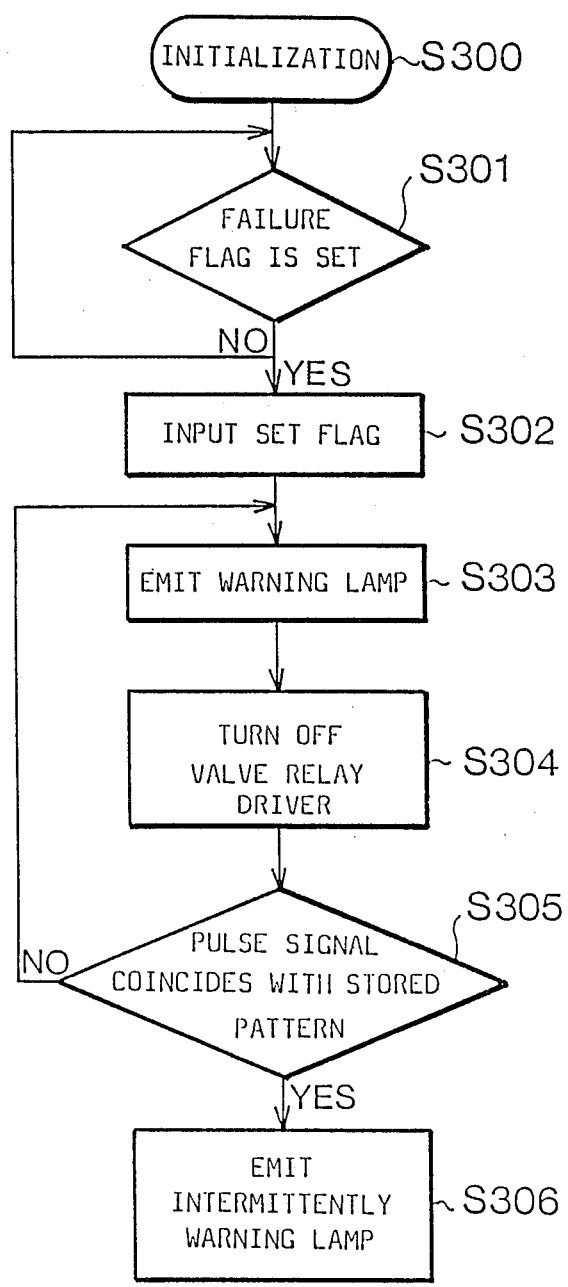

Referring to FIG. 6 showing an operation for indicating the failure of the sensor. After initialization at a step S300, it is determined whether one of wheel speed sensor failure flags No.1 to No.3 is set at a step S301. If a flag is set, the data representing the set flag is inputted at a step S302. Then, the warning lamp 8 is turned on at a step S303. The solenoid valve relay 20 and driver 18 are turned off at a step S304. The pulse signal PS from the brake pedal switch 9 is compared with the stored pattern at a step S305. If the pattern of the pulse signal PS coincides with the stored pattern, a signal for coded operation of the lamp 8 is produced, so that the lamp is intermittently lighted in accordance with the pattern for indicating the position of the failure at a step S306. If the pulse signal PS is not the same as the stored pattern, the program returns to the warning lamp emitting step S303.

In accordance with the present invention, since it is not necessary to provide a special display means and switches for indicating the abnormality and nature of the failure, the system is simplified in construction.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A system for displaying trouble in an electronic control system of a motor vehicle having detecting means for detecting failure in the electronic control system, and a warning lamp for displaying a detected failure, the system comprising:
    means for detecting nature of a failure in the electronic control system;
    comparing means for comparing the pattern of a pulse signal generated by operating a brake pedal switch in the vehicle with a predetermined stored pattern and for producing a failure signal representing the nature of the detected failure; and
    display means responsive to the failure signal for intermittently lighting the warning lamp in accordance with a predetermined pattern representing the nature of the failure.

2. The system according to claim 1 wherein the electronic control system is an electronic brake control system.

3. The system according to claim 1, wherein:
    said electronic control system includes a plurality of wheel speed sensors, and wherein the detected failure is failure of one of said wheel speed sensors and the nature of the failure represents the position of the failed wheel speed sensor.

4. The system according to claim 1, wherein:
    the electronic control system is an anti-skid brake system.

* * * * *